United States Patent [19]
Bessire

[11] 3,809,976
[45] May 7, 1974

[54] METHOD AND APPARATUS FOR SYNCHRONIZING A THREE PHASE MOTOR

[75] Inventor: Jean-Jacques Bessire, Bienne, Switzerland

[73] Assignee: H. et J. J. Bessire, S.A., Bienne, Switzerland

[22] Filed: Apr. 20, 1972

[21] Appl. No.: 245,873

Related U.S. Application Data
[63] Continuation of Ser. No. 40,770, May 27, 1970, abandoned.

[30] Foreign Application Priority Data
June 4, 1969 Switzerland.......................... 8474/69

[52] U.S. Cl..................... 318/78, 318/329, 318/171
[51] Int. Cl. ............................................. H02p 5/46
[58] Field of Search ............. 318/78, 138, 171, 227, 318/230, 231, 254, 314, 318, 329

[56] References Cited
UNITED STATES PATENTS

| | | | |
|---|---|---|---|
| 3,359,474 | 12/1967 | Welch et al......................... | 318/138 |
| 2,887,640 | 5/1959 | Thomas................................ | 318/138 |
| 3,317,805 | 2/1967 | Kay et al............................. | 318/231 |
| 3,345,547 | 10/1967 | Dunne................................. | 318/254 X |
| 3,353,076 | 11/1967 | Haines................................. | 318/254 X |
| 3,096,467 | 7/1963 | Angus et al......................... | 318/254 X |
| 2,418,112 | 4/1947 | De Rosa............................... | 318/78 X |
| 2,426,181 | 8/1947 | Deakin et al. ...................... | 318/78 X |

*Primary Examiner*—Gene Z. Rubinson
*Attorney, Agent, or Firm*—Young & Thompson

[57] ABSTRACT

The method and apparatus for synchronizing a three phase motor with a master motor or other device includes generating three phase voltage pulses which are controlled in frequency by the speed of rotation of the master motor and which vary in amplitude as a function of speed variations of said master motor. A pulse generator driven by the master motor provides pulses which are controlled in frequency by the speed of the master motor and directs such pulses as three phase voltage pulses to three commutating units which selectively feed a winding of a three phase motor. Each commutating unit receives voltage pulses of one phase, and upon receipt of such pulses, provides a signal to the associated motor winding. The amplitude of this signal is controlled as a function of an integrated signal derived from integrating pulses from the pulse generator.

5 Claims, 4 Drawing Figures

METHOD AND APPARATUS FOR SYNCHRONIZING A THREE PHASE MOTOR

This is a continuation, of application Ser. No. 40,770, filed May 27, 1970, now abandoned.

The present invention has for its object a synchronization device used to synchronize one or several recording or reading machines, which can be optical or magnetic on perforated film, with respect to a recording machine, a projector, a telemovie or any other pilot machine.

There exist two categories of such synchronization devices. A first uses a pulse generator driven by the first machine and controlling a step by step motor driving the second machine. The others use a sinusoidal current generator driven by the first machine and feeding, through the intermediary of a power amplifier, a synchronous motor driving the second machine.

Each of these types of devices has its advantages and its drawbacks which are either the use of a step by step motor which is not widely known or the use of great amplifiers. The present invention tries to obtain the same aim as the above mentioned devices in combining the advantages thereof and in avoiding their drawbacks.

The synchronization device according to the present invention comprises a direct current supply and a three phase synchronous motor connected in star the summit of which is directly connected to one of the terminals of the DC current supply. Each of the phases is connected to the other terminal of the direct current supply through the intermediary on the one hand of a separate commutator and on the other hand through a common integrator. The synchronization device also includes a pulse generator, a first circuit of which controls the commutator and a second circuit of which controls, through the intermediary of the integrator, the supply voltage of the motor.

The attached drawing shows schematically and by way of example one embodiment of the synchronization device.

Figure 2:
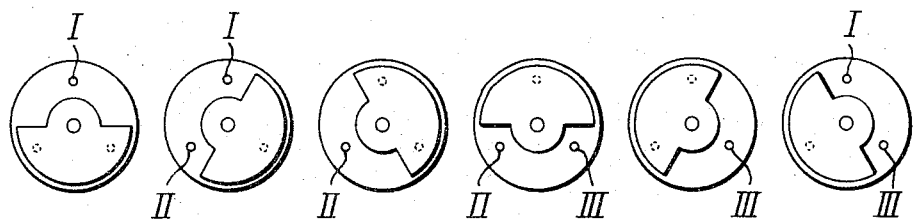
FIG. 2 shows different positions of a chopper included in a pulse generator during a cycle of operation of the synchronization device of FIG. 1.
Figure 1:
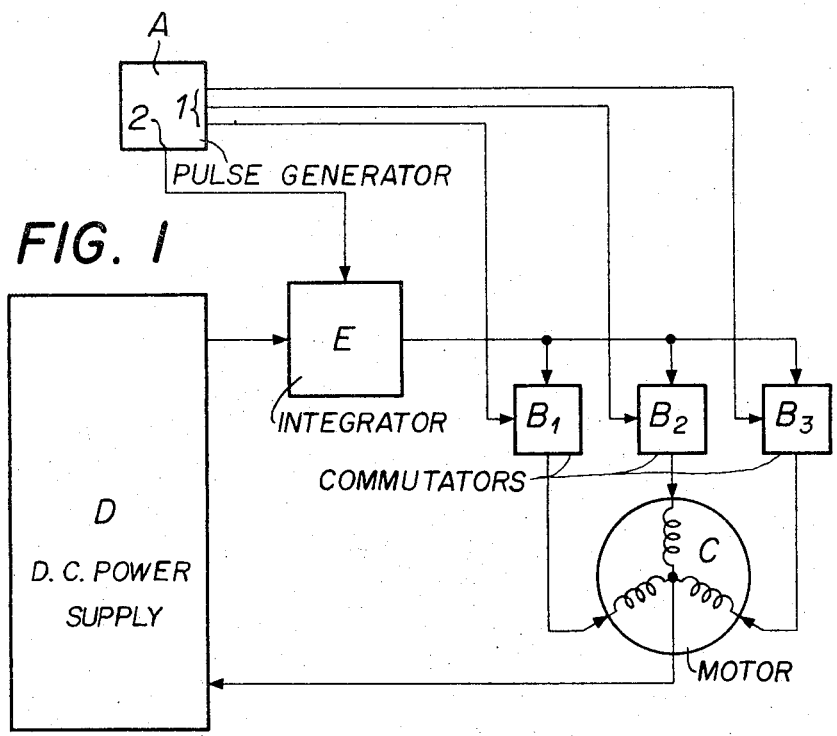
FIG. 1 is a block diagram of the synchronization device of the present invention.
Figure 3:
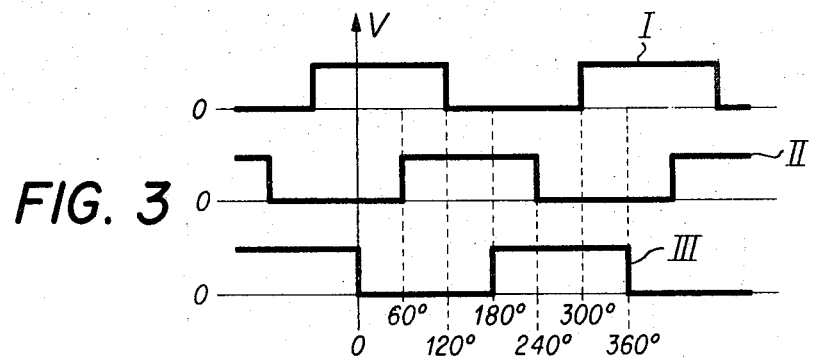
FIG. 3 shows the three outputs of the first circuit of the pulse generator during one cycle.
Figure 4:
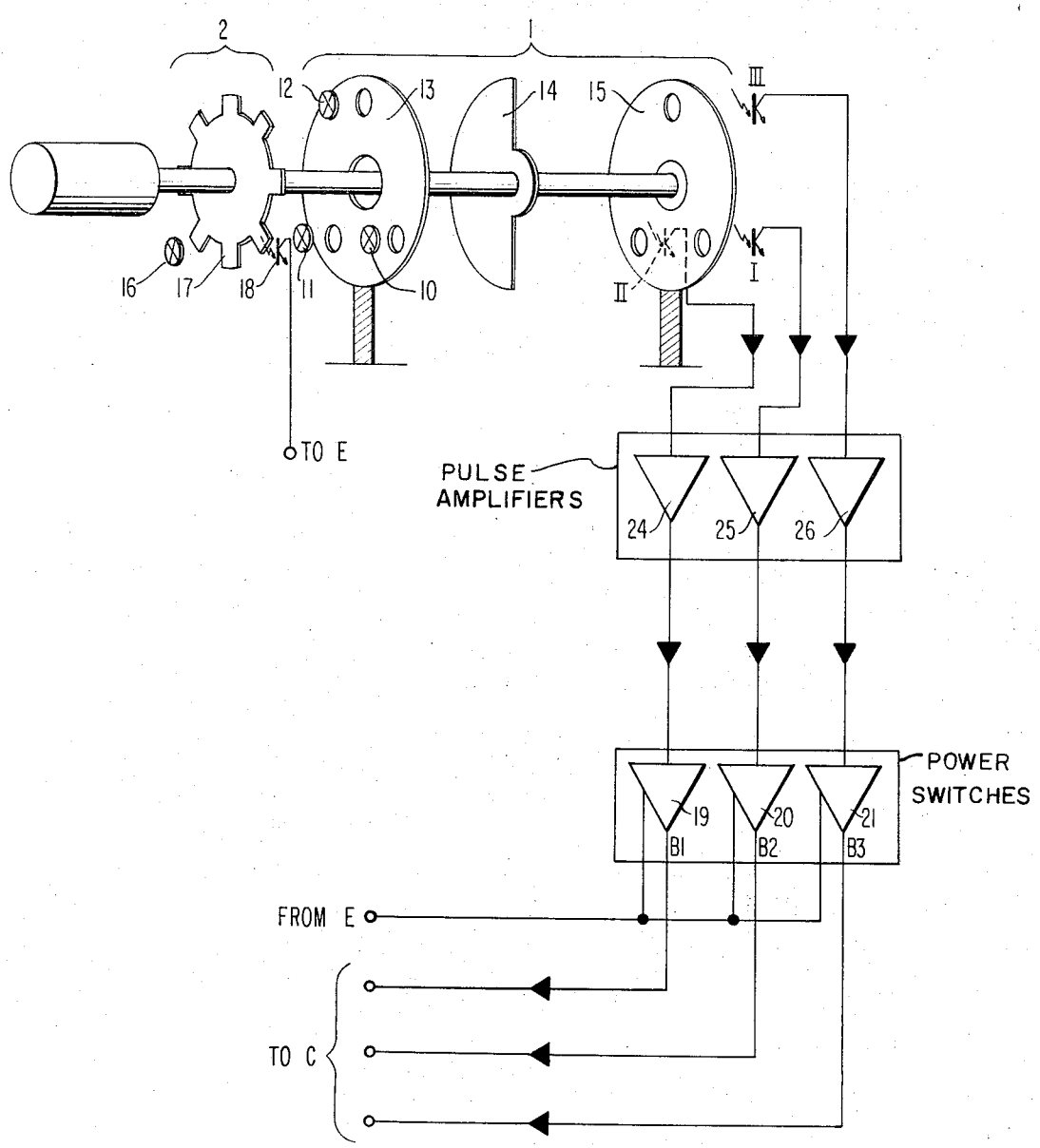
FIG. 4 is a block diagram of a portion of the device of FIG. 1.

The synchronization device is particularly well adapted to perforated strip recording machines and optical or magnetic soundreading machines and comprises:

a. a pulse generator A
b. three electronic commutators B1, B2, B3 actuated by the pulse generator A
c. a three phase synchronous motor C, fed by the commutators B1, B2, B3
d. a DC current supply D which can be a rectifier of a one- or three phase alternating current or an accumulator
e. an integrator device E which from the pulse generator A controls the DC supply voltage of the commutators B1, B2, B3, and thus of the motor C, as a function of the speed of rotation of the pulse generator A.

In a preferred embodiment the pulse generator A comprises two distinct circuits;

The first circuit 1 feeds the three electronic commutators B1, B2, B3, and includes three lamps 10, 11 and 12 and three photo-diodes I, II, III placed at 120° and a chopper 14 including two segments 13 and 15 each having opposed openings aligned with said lamps and photodiodes.

This disposition provides a basic frequency of 50 Hz. for a speed of rotation of 1.500 t/min.

It is of course possible to choose any number of segments if one desires generators having another speed of rotation for the frequency of 50 Hz.

The second circuit 2 comprises a lamp 16 and a photo-diode 18 receiving the pulses of a multi-notched obturator 17.

This second circuit is used to control the feeding voltage.

The main characteristic of this pulse generator and, therefore for the whole assemly, is that with respect to a cycle of a complete rotation, respectively of one period, the angular repartition of the pulses is realized as follows:

1. from 0° to 60°, only the photo-diode I is lighted
2. from 60° to 120°, the photo-diodes I and II are lighted
3. from 120° to 180°, only the photo-diode II is lighted
4. from 180° to 240°, the photo-diodes II and III are lighted
5. from 240° to 300°, only the photo-diode III is lighted
6. from 300° to 360°, the photo-diodes III and I are lighted These pulses are transmitted to the triphased sinchronous motor through the intermediary of the three electronic commutators B1, B2, B3, each composed of a pulse amplifier, 24, 25, and 26 having a power stage 19, 20, and 21.

This device has no power dissipation since it works according to the "on-off" principal (commutation).

The synchronous motor comprises a star-wound stator fed by the central point of the star.

The rotor is of the DC energization type for synchronization together with a short circuited winding for assynchronous starting on the main.

Due to the fact that the stator is fed successively through six different configurations of the feeding voltage, the rotor will take also six successive definite positions for each cycle or period.

Even though the traditional synchronous motor is fed by a series of pulses, its angular rotation is practically uniform, due to the 300 successive positionings which it receives per second, for a frequency of 50 Hz.

To permit to a such device to work for speeds starting at the frequency 0 up to frequencies much higher than 50 Hz. (250 Hz. for example which represents 5 times a nominal speed), it is necessary that the feeding voltage of the motor (respectively the amplitude of the feeding pulses) varies as a function of the frequency from a certain ground upwards.

The control of the variation of the feeding voltage is obtained through a device E which integrates calibrated pulses delivered by the second circuit of the optical pulse generator A.

These pulses are integrated to obtain a continuous voltage proportional to the frequency, this voltage is employed to control the stabilized supply so that the output current (respectively the torque) to the motor remains practically constant whatever its speed is.

One has thus realized a synchronization device which is original, combining the advantages of being simple, having a low net cost, and a high reliability.

It is evident that the pulse generator with photodiodes may be replaced by a pulse generator having mechanical contacts, brushes or segments (rotative contactors), or for example a "hall effect" system. The motor could have a rotor with direct energization, or a rotor having a squirrel cage winding with synchronization notches.

The variation of the feeding voltage is obtained through the stabilized supply where the maximum voltage for the greatest speed is reduced, according to the lower speed. This energy is thus lost. However, where the supply is done by an alternating supply which is rectified, it would be possible to control the voltage variation at the primary of the rectifier by modifying the input alternating voltage, by controlling either transducers or by thyristors.

Also, the pulse generator could comprise only one circuit controlling on the one hand the commutators and on the other hand the integrator device E, and thus the value of the feeding voltage of the motor.

I claim:

1. A method for synchronizing a three phase synchronous motor having at least one stator winding for each phase with the speed of a master motor which includes sensing said master motor speed, generating a train of timing pulses for the stator windings of each phase of said synchronous motor which form a three phase group of pulses controlled in frequency by the speed of rotation of said master motor, generating a train of control pulses having a frequency which is a function of the speed of rotation of said master motor, using said control pulses to provide a D.C. power signal having an amplitude which is a function of the frequency of said train of control pulses, and feeding the D.C. power signal to the stator windings for each phase of said synchronous motor in accordance with the respective timing pulse train for said phase to provide three driving pulses for each said stator winding for each rotation of said master motor having the amplitude of said D.C. power signal and the frequency and phase of the respective timing pulse train.

2. The method according to claim 1 which includes energizing six different stator winding combinations with said driving pulses during each cycle of rotation of said master motor during six separate 60° segments of the rotating cycle of said master motor by providing a driving pulse to a first stator winding; subsequently providing simultaneous driving pulses to the first and a second stator winding; subsequently providing a driving pulse to said second stator winding; subsequently providing simultaneous driving pulses to the second and a third stator winding; subsequently providing a driving pulse to the third stator winding; and subsequently providing simultaneous driving pulses to the first and third stator windings.

3. A motor synchronization system operative in response to a master rotating device comprising a three phase synchronous electric motor having star connected stator winding means, said stator winding means including at least one stator winding for each motor phase, switching means connected to supply a power signal to said stator winding means upon receipt of an activating pulse, said switching means including a first pulse operated switch unit connected to a first stator winding, a second pulse operated switch unit connected to a second stator winding and a third pulse operated switch unit connected to a third stator winding, power supply means connected to provide said power signal to said pulse operated switch units, pulse generator means operative to generate three phase output pulses which are controlled in frequency by the speed of rotation of said master rotating device and which vary in frequency in direct relation to variations in the speed of rotation of said master rotating device and to provide output pulses of each phase as activating pulses to a different one of said pulse operated switch units to cause the switch unit upon receipt of said activating pulse to supply said power signal to the stator winding connected thereto, said pulse generator means operating to provide six different activating pulse combinations to said switch units during each cycle of rotation of said master rotating device, and integrator control means connected to receive output pulses from said pulse generator means and to control the amplitude of said power signal as a function of variations in the speed of said master rotating device.

4. The motor synchronization system of claim 3 wherein said pulse generator means provides three activating pulses to each switch unit during each cycle of rotation of said master rotating device.

5. The master synchronization system of claim 4 wherein said pulse generator means operates during six separate 60° segments of the rotating cycle of said master rotating device to provide respectively; an activating pulse to said first switch unit; simultaneous activating pulses to said first and second switch units; an activating pulse to said second switch unit; simultaneous activating pulses to said second and third switch units; an activating pulse to said third switch unit; and simultaneous activating pulses to said first and third switch units.

* * * * *